United States Patent [19]

Ben-David et al.

[11] Patent Number: 5,889,684
[45] Date of Patent: Mar. 30, 1999

[54] COMPUTER-CONTROLLED HEATED AND/ OR COOLED LIQUID DISPENSER

[75] Inventors: Yitshaq Ben-David, Tel-Aviv, Israel; Jeremy Ben-David, London, England

[73] Assignee: Waterlogic International Ltd., Wembley, United Kingdom

[21] Appl. No.: 730,911

[22] Filed: Oct. 18, 1996

[51] Int. Cl.[6] .................................................. G01F 23/70
[52] U.S. Cl. .............................. 364/528.17; 364/528.18; 222/146.1
[58] Field of Search ............................. 364/510, 528.16, 364/528.17, 528.18; 222/54, 67, 14, 146.1, 386.5, 61, 64, 108; 239/1

[56] References Cited

U.S. PATENT DOCUMENTS

| | | | |
|---|---|---|---|
| 4,007,856 | 2/1977 | Murphy et al. | 222/67 |
| 4,420,811 | 12/1983 | Tarnay et al. | 364/510 |
| 4,623,467 | 11/1986 | Hamlin | 210/652 |
| 4,909,931 | 3/1990 | Bibi . | |
| 4,969,991 | 11/1990 | Valadez | 210/96.2 |
| 4,974,643 | 12/1990 | Bennett et al. | 141/1 |
| 4,979,639 | 12/1990 | Hoover et al. | 222/1 |
| 5,111,969 | 5/1992 | Knepler | 222/54 |
| 5,112,477 | 5/1992 | Hamlin | 210/85 |
| 5,443,739 | 8/1995 | Vogel et al. | 210/652 |

OTHER PUBLICATIONS

Advertisement Mini Tami Bar/Tami Bar (Hot & Cold).
Advertisement Mini Tami Bar/Tami Bar.
Advertisement "The Waterlogics" (Hot and Cold).
Advertisement "The Waterlogic" (Cold).
Advertisement "Waterlogic The Unique U.V. Hot/Cold".
Advertisement "Counter Top Systems" of Ebtech.
Advertisement "Sunrise Point–of–Use" of Sunroc.
Advertisement "Waterlogics The Next Generation" (Hot and Cold).
Advertisement "Waterlogics The Next Generation" (Cold).
Illustration of System described in Advertisement titled "Waterlogics The Next Generation" (Hot and Cold).

Primary Examiner—James P. Trammell
Assistant Examiner—Matthew Smithers
Attorney, Agent, or Firm—Cowan, Liebowitz & Latman, P.C.

[57] ABSTRACT

A liquid, e.g., water, dispenser is disclosed which includes a programmed processor which controls many dispensing functions, including controlling liquid dispensing, controlling heating and cooling of liquid, monitoring uv sterilization, monitoring liquid in the drip tray, selecting and setting liquid temperature and displaying information relating to dispensing. The dispenser monitors uv sterilization by sensing uv light passing through the liquid to be dispensed. The dispenser prevents dispensing of the sterilized liquid if sterilization is not proceeding satisfactorily, and prevents dispensing of liquid altogether if the drip tray is full.

26 Claims, 9 Drawing Sheets

COMPUTER-CONTROLLED HEATED AND/OR COOLED LIQUID DISPENSER

BACKGROUND OF THE INVENTION

The invention disclosed herein relates to liquid dispensers for dispensing liquids for human consumption, particularly heated and/or cooled water dispensers in which the water may also be purified.

OBJECTS AND SUMMARY OF THE INVENTION

It is an object of the invention disclosed herein to provide apparatus for dispensing liquid(s) for human consumption which has an increased number of automatic features, and another object is that these automatic features be computer controlled.

It is another object of the invention to provide apparatus for dispensing liquid(s) for human consumption which digitally displays one or more parameters associated with functions monitored or controlled by the apparatus.

It is another object of the invention to provide apparatus for dispensing liquid(s) for human consumption which provides indication and/or display ol an increased number of parameters associated with functions monitored or controlled by the apparatus.

It is another object of the invention to automatically prevent overflow ol liquid from a liquid drip or overflow tray in apparatus for dispensing liquids for human consumption.

It is another object of the invention to provide apparatus for dispensing liquid(s) for human consumption which purifies (e.g., by sterilization) a liquid to be dispensed while ensuring that liquid purification is carried out effectively and continuously whenever the apparatus is enabled to dispense the purified liquid.

It is another object of the invention to enable installers and users of apparatus for dispensing liquid(s) for human consumption to easily and accurately select and set (or change) the temperature(s) of the liquid(s) to be dispensed.

It is another object of the invention to achieve one or more ol the above objects by computer control.

The invention disclosed herein achieves the above and other objects by providing apparatus for dispensing one or more liquids for human consumption which include various combinations of features and functions under control of a programmed processor or computer. In the preferred embodiments, the controlled functions include liquid dispensing, heating and/or cooling of liquid, monitoring for purification (e.g., sterilization) of the liquid(s), selecting, and setting (or changing) the set temperature(s) of the liquid(s), and indication of parameters and status associated with the monitored and/or controlled functions. "Indication", "indicate" or "indicating" is meant in a broad sense herein, and encompasses visible and audible indications, including digital and analog displays, light emitters (e.g., LEDs) and sound emitters (e.g., buzzers), speech synthesizers, etc. "Display" or "displaying" refers to a visible representation of information in words, numbers, graphics, etc., and an audible representation of information in words, numbers, etc.

These functions include, but are not limited to, the following: monitoring the liquid level in an overflow or drip tray which receives dispensed liquid that spilled or overflowed from a container being filled or dripped from the dispenser's outlet, etc., and indicating status and/or a parameter and/or preventing further dispensing of liquid when the apparatus senses or detects a tray-filled condition until the tray is emptied; monitoring the operation of liquid purification by the apparatus, and indicating status and/or a parameter and/or preventing further dispensing of liquid to be purified when the apparatus senses or detects that purification may not be proceeding satisfactorily; monitoring the temperature of a liquid or liquids, comparing the sensed or detected temperature to a set, changed or default temperature, and indicating status and/or temperature and/or controlling heating or cooling apparatus to change the temperature of the liquids; permitting the input of a parameter which the apparatus uses to control some parameter or function of the liquid, and preferably indicating the parameter at least during the input operation; and indicating the status of one or more control functions such as heating or cooling the liquid, dispensing the liquid, etc., or parameters such as temperature.

In the preferred embodiments: the liquid purification operation that is monitored is a sterilization operation using an ultraviolet ("UV") lamp; the apparatus indicates liquid heating status, liquid cooling status, liquid dispensing status, power status, sterilization status; and the apparatus displays the sensed or detected temperature of the liquid and the temperature to which the liquid is to be heated and/or cooled. In the preferred embodiments, the apparatus dispenses water, which may be still or aerated. In one embodiment, the apparatus dispenses cold and hot water, and in other embodiments either cold or hot water. In the preferred embodiments, the status indications arc provided by light emitting devices such as LEDs and/or sound emitting devices such as buzzers. The heating status indication indicates that a liquid heater is on and the cooling status indication indicates the a refrigerant compressor is on. The dispensing status indication indicates that a liquid flow control device (e.g., a solenoid valve) is on through which liquid may pass during a dispensing operation.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which.

DESCRIPTION OF THE PREFERRED EMBODIMENTS

In the preferred embodiments, the liquid dispenser is a water dispenser. In one embodiment, the water dispenser dispenses hot and cold water and controls the temperatures of both. In another embodiment, the water dispenser dispenses only cold water and controls the temperature of the cold water. In both embodiments, the water dispenser purifies the water by mechanical and chemical filtration. The chemical filtration in the preferred embodiments is achieved using by chemical pre-filters and sterilization using UV light. Other types of filters and/or filtration systems may be used, and the specific type or types will depend upon pollutants, applications etc. There is no intention to limit the invention to either embodiment, to dispensing only water, or to a dispenser which includes purification or a specific type or types of filters. The liquid need not be water and can be any suitable liquid, and can be an aerated or still liquid.

Figure 1:
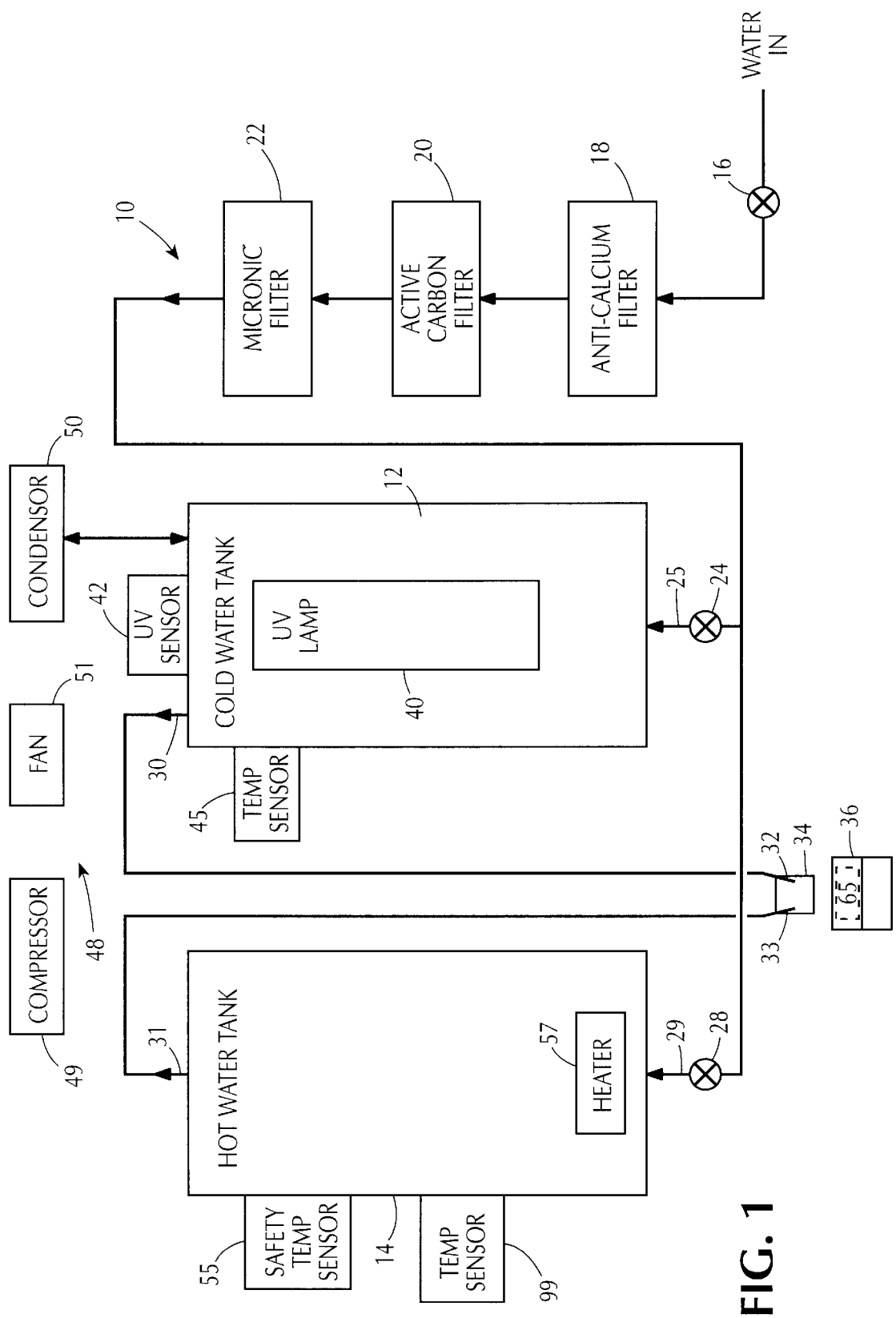
FIG. 1 is combined schematic and block diagram of one embodiment of a water dispenser incorporating the invention disclosed herein.
Figure 2:
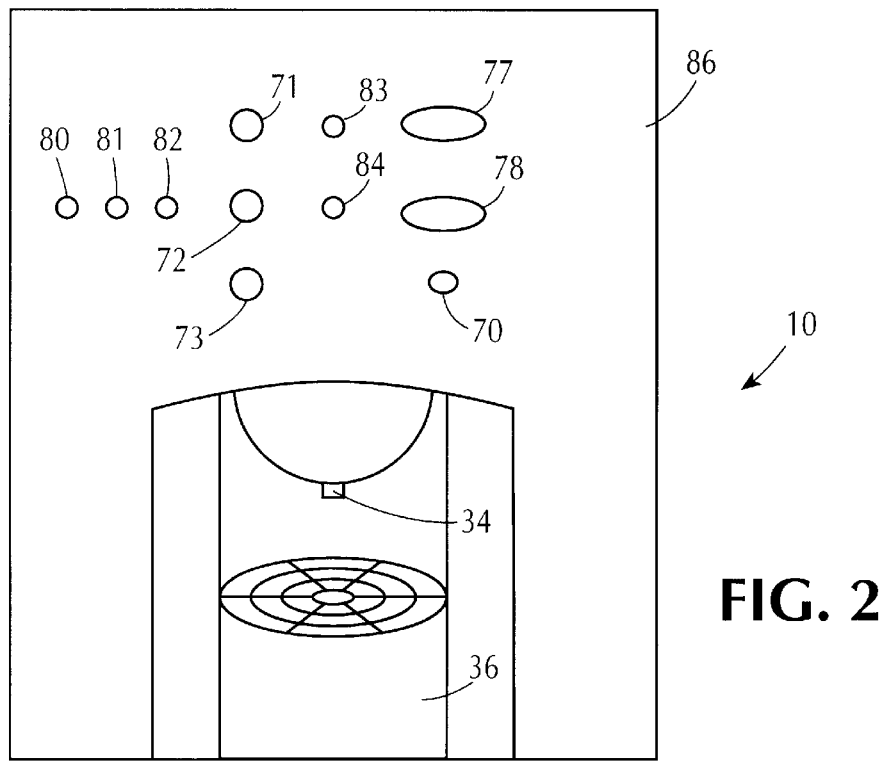
FIG. 2 is a diagrammatic view of the front control panel, water outlet and drip tray of the water dispenser represented in FIG. 1.
Figure 3:
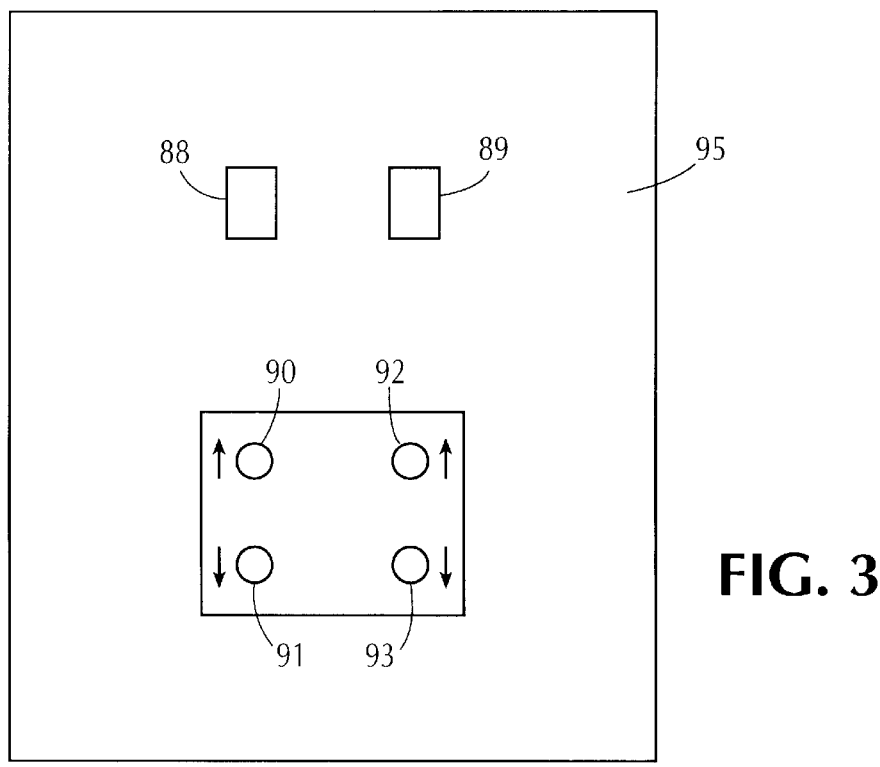
FIG. 3 is a diagrammatic view of a section of the rear control panel of the water dispenser represented in FIG. 1.

Referring to FIG. 1, water dispenser 10 includes a cold water tank 12 and a hot water tank 14. Water is supplied to dispenser 10 from a source through a manually operated control valve 16. Coupled serially between the valve 16 and the hot and cold water tanks 12 and 14 are an anti-calcium filter 18, an active carbon filter 20 and a micronic filter 22. A cold water solenoid control valve 24 is positioned between the micronic filter 22 and the inlet 25 to the cold water tank 12, and a hot water solenoid control valve 28 is positioned between the micronic filter 22 and the inlet 29 to the hot water tank 14. The outlets 30, 31 from the cold and hot water tanks 12, 14, respectively, are coupled to respective nozzles 32, 33 positioned above a drip tray 36 spaced sufficiently to accommodate containers such as cups of suitable sizes therebetween. The nozzles 32,33 may be accommodated within a common nozzle 34, as shown in FIG. 2.

Mounted coaxially within the cylindrical cold water tank 12 is a UV lamp 40 housed within a refractive lightly polished quartz housing. Also mounted on the cold water tank 12 spaced a suitable distance from the lamp 40 is a UV light sensor 42. A temperature sensor 45, used in controlling the temperature of the cold water, is also mounted on the cold water tank 12. A refrigeration unit 48 comprising a compressor 49, a condenser 50 and a fan 51 cools the water in the cold water tank 12.

Mounted on the hot water tank 14 is another temperature sensor 55 used in controlling the temperature of the hot water. The water in the hot water tank 14 is heated by a heater 57.

Figure 4:
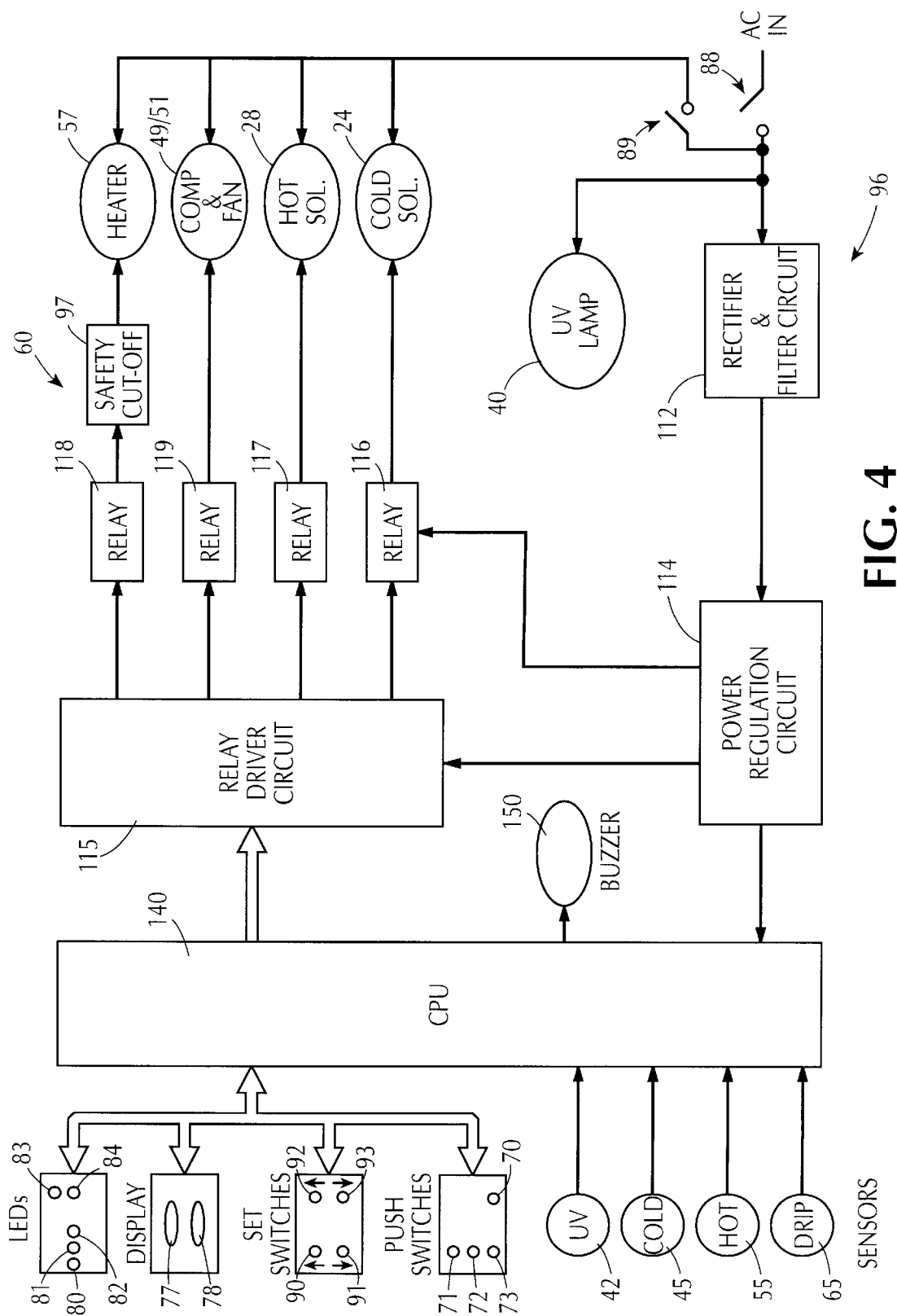
FIG. 4 is a block diagram of the electrical portion of the water dispenser represented in FIG. 1.

The solenoid control valves 24 and 28, the UV lamp 40, the UV light sensor 42, the cold water temperature sensor 45, the compressor 49, the fan 51, the hot water temperature sensor 55 and the heater 57 are all connected to a computerized control circuit 60 shown in FIG. 4. Referring to FIGS. 1–4, the following components arc also connected to the computerized control circuit 60: a liquid level or drip tray sensor 65 (FIG. 1) positioned in the drip tray 36; water dispensing switches 71–73 (FIGS. 2 and 4), LCD) displays 77, 78 and LED indicators 80–84, all located on the front control panel 86; manually operated temperature regulating main power switch 88 (FIGS. 3 and 4), manually operated power control switch 89 (FIGS. 3 and 4) and manually operated temperature setting switches 90–93, all located on the rear control panel 95. The power switch 89 (FIG. 4) couples power to the power supply circuit 96 from which all components of dispenser 10 are powered except the compressor 49, the fan 51 and the heater 57, which are powered directly from the AC line or mains through the control switch 88. A thermal safety cut-off device 97 (FIG. 4) is connected in series with heater 57 and its temperature sensor 99 (FIG. 1) is mounted on the hot water tank 14.

Referring to FIGS. 1–4, as explained in more detail below, the computerized control circuit 60 performs the following functions: controls compressor 49 and the fan 51 to control the temperature of the water in the cold water tank 12 in response to the cold water temperature sensor 45 and a set temperature which may be a default temperature or a cold water temperature input via cold temperature setting switches 90, 91; controls the heater 57 to control the temperature of the water in the hot water tank 14 in response to the hot water temperature sensor 55 and a set temperature which may be a default temperature or a hot water temperature input via hot temperature setting switches 92, 93; controls the dispensing of cold water via the cold water solenoid control valve 24 in response to cold water switch 71; controls the dispensing of hot water via the hot water solenoid control valve 28 in response to extra hot water switch 70 and in response to the hot water switch 72 and the secure switch 73 simultaneously; prevents the dispensing of cold water by controlling the solenoid control valve 24 in response to the UV light sensor 42; and prevents the dispensing of cold and hot water by controlling the solenoid control valves 24 and 28 in response to the drip tray sensor 65.

FIG. 4 schematically shows the electrical components in the computerized control circuit 60 which controls the temperature and flow of water from the dispenser 10. The manually operated power switch 89 located on the rear control panel 95 (FIG. 3) passes AC power from the AC line or mains (230 v, 50 Hz in UK) to the power supply circuit 96 which includes a filter and rectification circuit 112 and a DC regulator circuit 114. The DC regulator circuit 114 supplies current to the coils of the relays 116–119 that control, respectively, the supply of current to solenoid valves 28 and 24, heater 57 and the compressor 49 and fan 51. The thermal safety cut-off device 97 cuts power off to the heater 57 in response to the temperature sensor 99 (FIG. 1) independently of a programmed processor in the control circuit 60 to prevent the hot water temperature from rising above a maximum safe value. The DC regulator 114 also supplies power to components in the computerized control circuit 60 such as integrated circuits.

The computerized control circuit 60 includes a programmed processor (CPU) 140 which receives digital input signals from the following sensors: cold water sensor 45, hot water sensor 55, UV light sensor 30, drip tray sensor 65. The computerized control circuit also receives digital signals resulting from activation of the temperature set switches 90–93 on the rear control panel and the water dispensing control switches 70–73 on the front control panel. The CPU 140 also outputs signals on these lines to the LCD displays 77 and 78, and to LED indicators 81–85. CPU also outputs a signal to activate buzzer indicator 150.

The UV sensor 30 may be a cadmium sulfide light detector which provides an analog signal to a threshold device that in turn provides logic level signals to the CPU 140 in response to the light received by the sensor. In response to the output of the UV sensor 30, the CPU 140 disables relay 116 to prevent dispensing of cold water, and may also disable relay 119 to prevent cooling. Alternatively. the CPU 140 disables relays 116–to prevent all dispensing, cooling and heating of the water, turns respective LEDs on or off, as described below, and turns the buzzer 150 on. The cold and hot water sensors 45 and 55 may be thermistors which provide an analog input to the CPU 140. From these analog signals, the CPU computes the respective temperatures of the water, and the CPU compares the respective sensed temperatures to respective default settings programmed into the CPU or temperatures set into the CPU by switches 90–93. In response to the temperature comparisons, the CPU energizes relays 118 and/or 119 to turn the heater 57 on and/or the compressor 49 and fan 51 on. The CPU also causes temperature values to be displayed on display sections 77 and 78, as described below.

The drip tray sensor 65 may be an analog device which provides an analog signal to a threshold device which in turn supplies logic level signals to the CPU 140 in response to the level of water in the drip tray, e.g., liquid resistance switch or a pressure switch activated by the weight of the water. Alternatively, the drip tray sensor 65 may be an on-off switch. In response to that logic level, the CPU 140 disables relays 116–119 to prevent all dispensing, cooling and heating of the water, turns respective LEDs on or off, as described below, and turns the buzzer 150 on.

Switches 70–73 may be push button switches. In response to pressing cold water switch 70, the CPU 140 causes the relay driver circuit 115 to energize relay 116 and turn the cold water solenoid valve 24 on. In response to simultaneously pressing hot water switch 72 and secure switch 73, the CPU 140 causes the relay driver circuit 115 to energize relay 117 and turn the hot water solenoid valve 24 on. In response to pressing the extra hot water switch 73, the CPU 140 also causes the relay driver circuit 115 to energize relay 117 and turn the hot water solenoid valve 25 on. The CPU also turns respective LEDs on or off, as described below.

The electrical components in control circuit 60 may be conventional and control circuit 60 also includes other components not shown at the block diagram level of FIG. 4, such as, for example, drivers for the LEDs, amplifiers for the analog sensors etc., which are conventional and are known to those of skill in the art. The CPU 140 is preferably a Motorola MC68705R 8-bit EPROM microcontroller. The LCD displays 77 and 78 may each be conventional 7 segment, two digit displays.

The dispenser 10 represented in FIGS. 1–4 may be operated in a number of ways to dispense hot and cold water, set the desired temperature of the hot and cold water, control the temperature of the hot and cold water, display the set and actual temperatures of the hot and cold water, prevent overfilling of the drip tray, and ensure that the cold water is chemically purified and sterilized. The flow charts of FIGS. 5–9 illustrate one such way. However, there is no intention to limit the invention to the specific sequence and method represented by these flow charts, and other sequences and methods will be apparent to those of skill in the art from the disclosure herein. Further, computer programs to implement the sequence and method represented by the flow charts and other sequences and methods may be constructed by those of skill in the art from the disclosure herein. Also, it should be evident that many flow routes are or may be parallel processed, depending upon the capability and programming of the CPU, and one of skill in the art may construct suitable programs from the disclosure herein. Operation of the dispenser 10 represented in FIGS. 1–4 will be discussed with reference to the flow charts of FIGS. 5–9.

Figure 5:
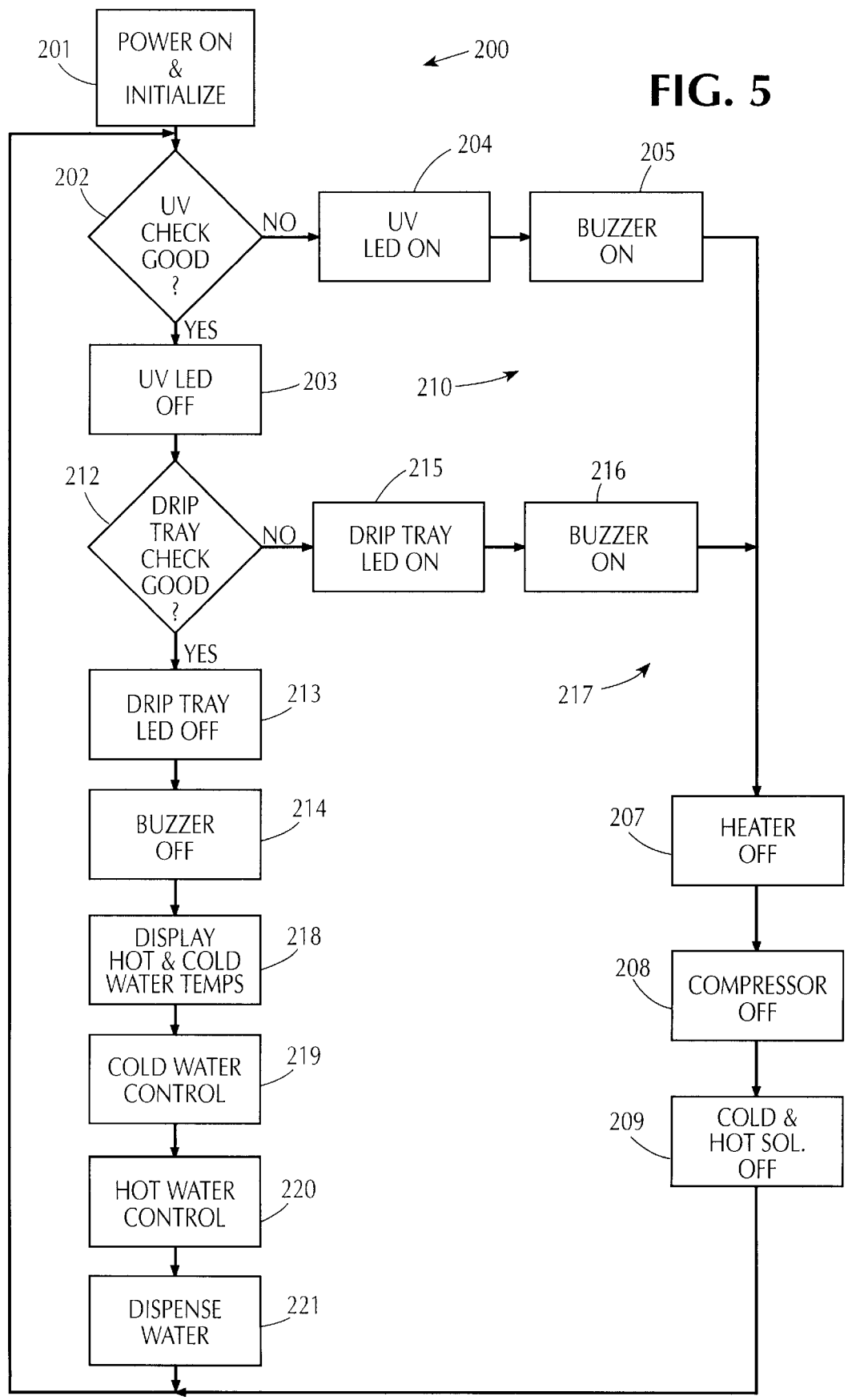
FIGS. 5–9 are flow charts illustrating operation of the water dispenser represented in FIGS. 1–4.

FIG. 5 illustrates one main loop 200 according to which the dispenser 10 may operate. The referenced components of dispenser 10 are shown in FIG. 4. Upon turning on the AC power switch 89, the CPU 140 in step 201 initializes the computerized control circuit 60 and turns the power LED 80 on, the UV fail LED 81 on, and the drip tray fail LED 82 off. In step 202 the CPU 140 receives the output of the UV light sensor 30. If the UV sensor 30 provides the proper logic level signal to the CPU, then the UV check is good and the UV LED 81 is kept on (or turned on if it is off from a previous cycle of the main loop) in step 203. If the UV light sensor 30 provides the improper logic level signal to the CPU, then the UV LED 81 is turned off in step 204 and the buzzer 150 is activated in step 205. The buzzer 150 may be activated until the low UV level is corrected, for example by changing the UV lamp 40 (FIG. 1). The cold solenoid valve 45 is turned off in step 207, and the UV check loop 210 is repeated until the check is good.

When the UV check is good, the UV LED 81 is turned on in step 203 and the drip tray check is made in step 212. If the drip tray sensor 65 provides the proper logic level to the CPU, then the drip tray check is good and the drip tray fail LED 82 and the buzzer 150 are kept off (or turned off if they are on from a previous cycle of the main loop) in steps 213 and 214. If the drip tray sensor 65 provides the improper logic level to the CPU, then, the drip tray fail LED 82 is turned on in step 215 and the buzzer 150 is activated in step 216. The buzzer 150 may be activated until the drip tray is emptied. In this embodiment, the buzzer 150 sounds until the trip tray is emptied. The hot and cold solenoid valves 55 and 45 (relays 116 and 117) are turned off in step 208, and drip tray loop 217 is repeated (after steps 202 and 203) until the drip tray check is good.

Figure 8:
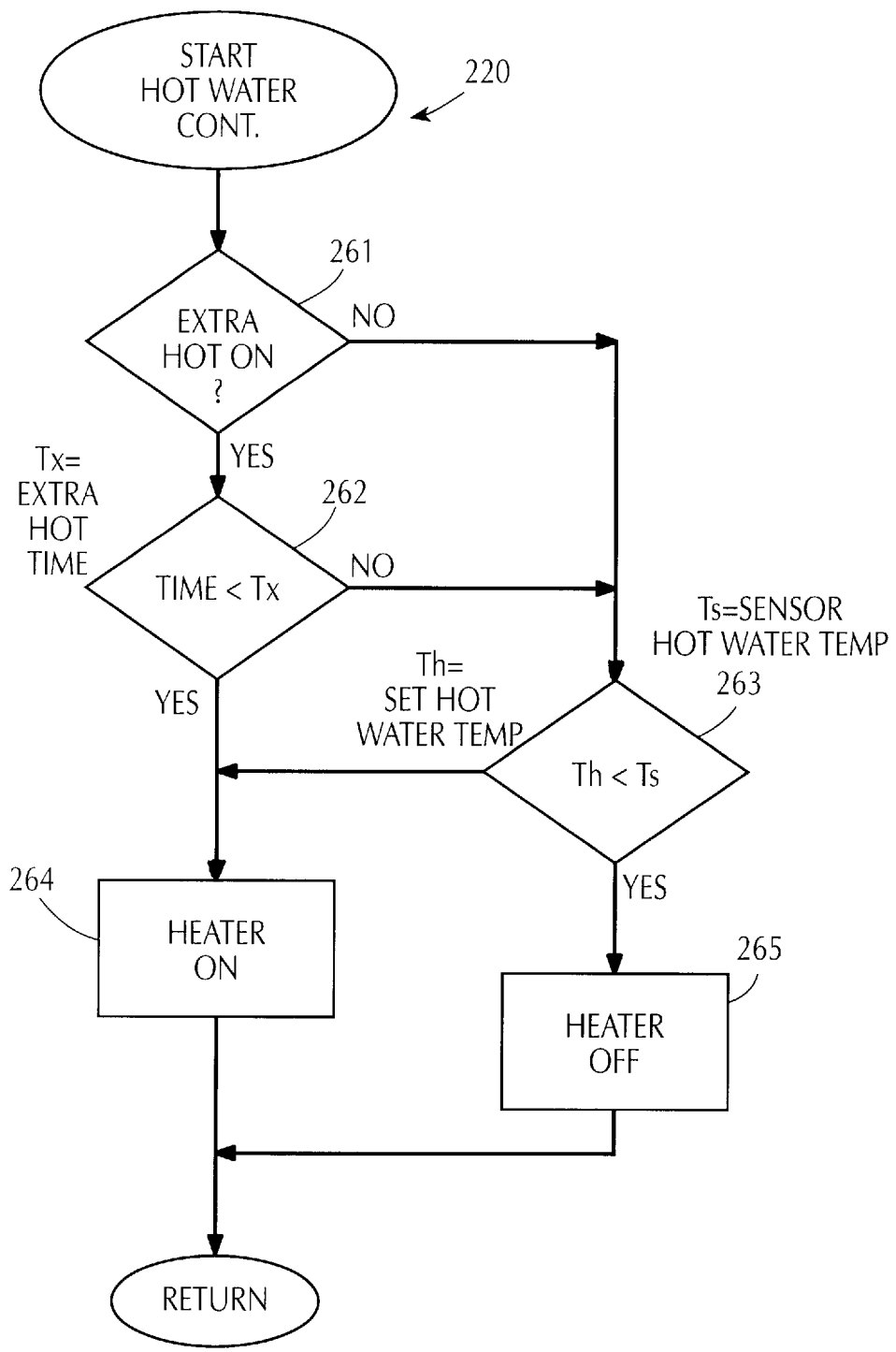
Figure 9:
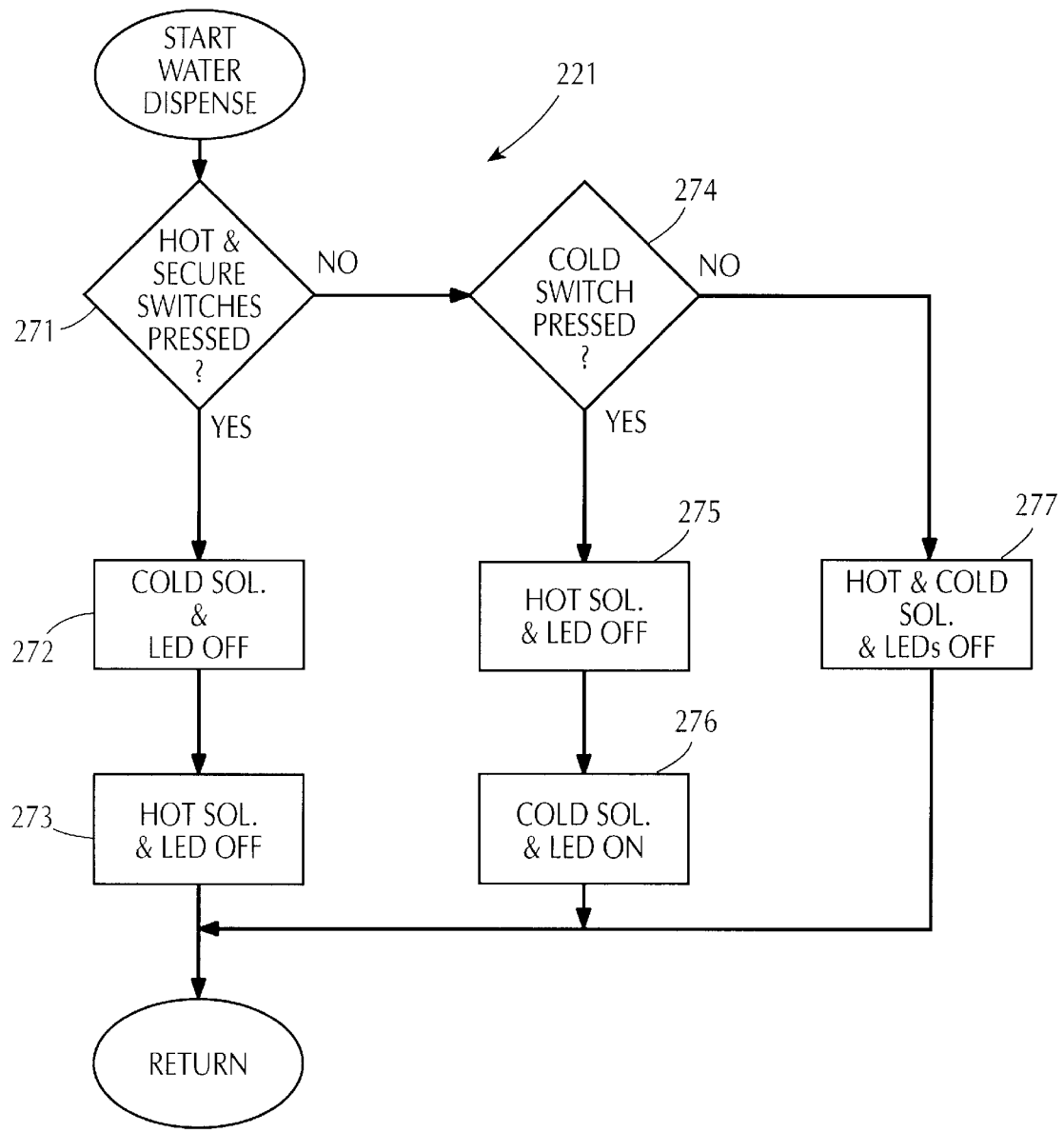

If the UV check and the drip tray checks are good per steps 202 and 212, the water temperatures are displayed in step 219 (per the temperature display routine flow charted in FIG. 6), the cold water temperature is regulated in step 219 (per the cold water control routine flow charted in FIG. 7), the hot water temperature regulated in step 220 (per the hot water control routine flow charted in FIG. 8) and water dispensed in step 221 (per the water dispensing routine flow charted in FIG. 9).

Figure 6:
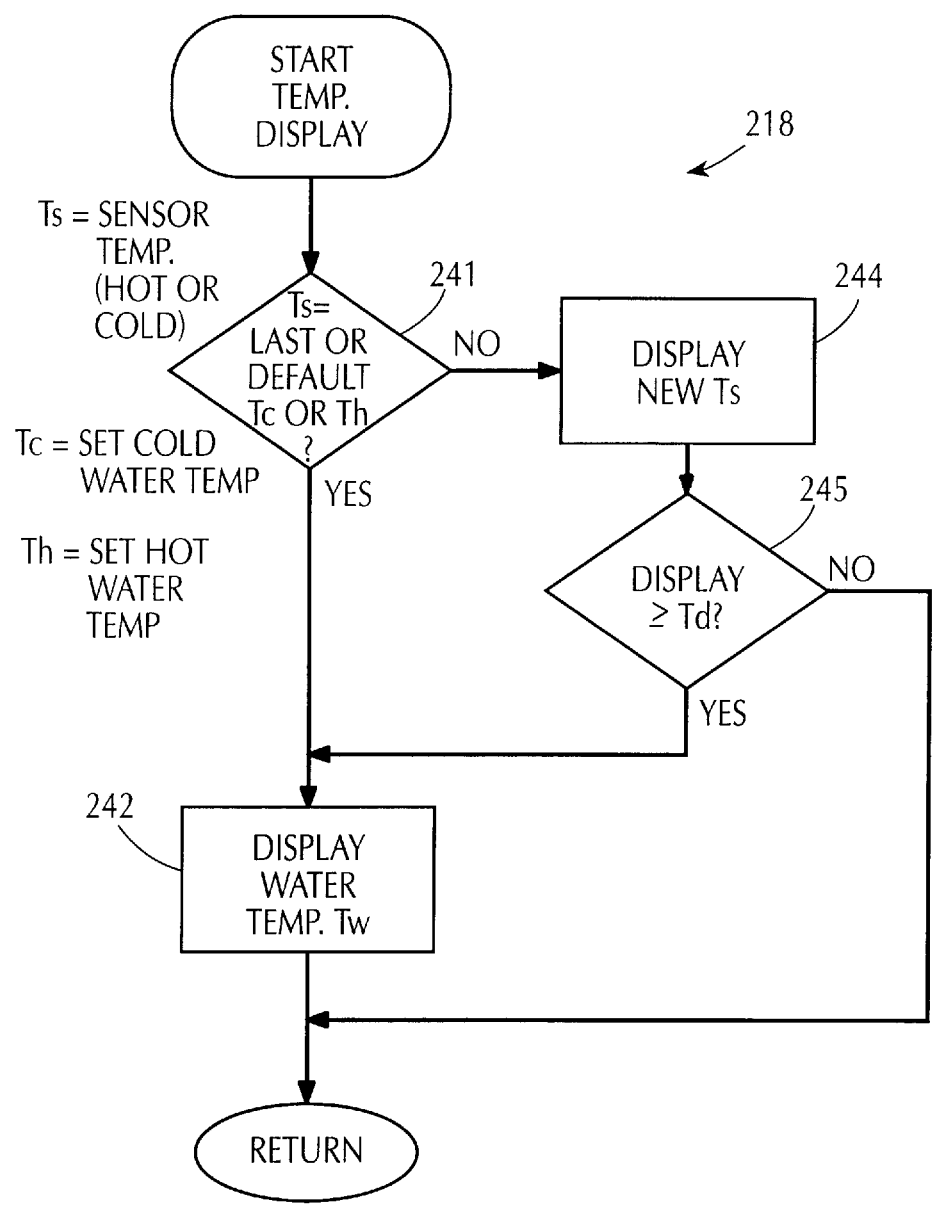

Referring to FIG. 6, the flow routes for displaying the cold and hot water temperatures are separate but identical. The temperature Ts sensed by the cold and hot water temperature sensor 24 or 28 is compared to the default or last set cold or hot water temperature Tc or Th in step 241. If it is the same, then there has been no new temperature input by the set temperature switches 90, 91 or 92, 93 and the cold or hot water temperature sensed by the cold or hot water sensor 24 or 28 is displayed by display 27 or 28 in step 242 and there is return to the main loop at step 219. If in step 241 there has been a change from the default or last the set temperature, the newly set temperature Ts is displayed in display 27 or 28 in step 244 for a short display time Td of, for example, three seconds as determined in step 245 after return to the main loop 200. After the expiration of Td, the water temperature is displayed in step 242 as discussed above and the routine 218 returns to the main loop 200 at step 219, cold water control.

Figure 7:
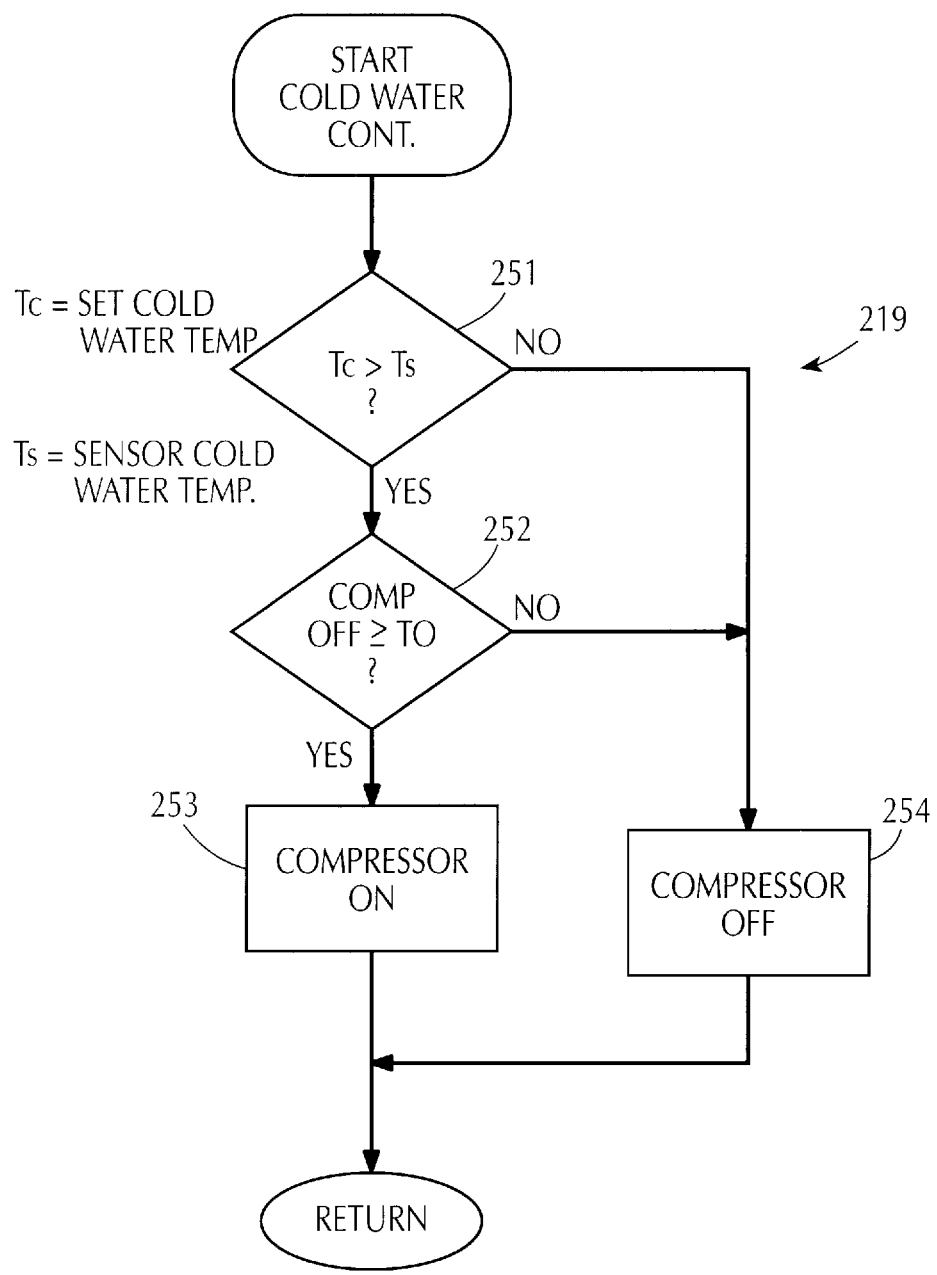

Referring to FIG. 7, the cold water control routine 219 compares the set cold water temperature Tc to the sensed cold water temperature Ts in step 251. If the set temperature is greater than the sensed temperature then the compressor 49 and fan 51 are turned on in step 253 provided that the compressor has been off for a given time To for example, 1.5 minutes as determined in step 252. If the set temperature is less than or equal to the sensed temperature, or if the compressor has not been off longer than To, then the compressor is turned off (or kept off) in step 254 and routine 219 returns to the main loop 200 at step 220, hot water control.

Referring to FIG. 8, step 261 determines if the extra hot switch 70 has been activated, and if so, relay 118 is energized in step 264 to supply current to the heater 57 for a given period of time Tx, for example 30 seconds, as determined in step 262 and as long as the maximum temperature of the thermal safety cut-off device 97 is not reached. If the extra hot switch 70 has not been activated, or if Tx has elapsed since activation, the set hot water temperature Th and the sensed hot water temperature Ts are compared in step 263. If the set temperature is less than the sensed temperature, the heater is turned on in step 264, and if not, the heater is turned off (or kept off) in step 265 and the routine 220 returns to the main loop 200 at step 221, water dispensing.

Referring to FIG. 9, if the hot and secure buttons 72 and 73 are simultaneously pressed as determined in step 271, the cold water relay 116 is deenergized (or kept deenergized) in step 272 to turn cold water solenoid valve 24 off and the hot water relay 117 is energized to turn the hot water solenoid valve 28 on to dispense hot water for so long as the hot water and secure switches remain pressed, or alternatively dispense a metered amount of hot water. If step 271 determines that the hot and secure switches are not simultaneously pressed, step 274 determines if the cold water switch 71 is pressed. If it is, then the hot water relay 117 is deenergized (or kept deenergized) in step 275 to turn off the hot water solenoid valve 28 and the cold water relay 116 is energized in step 276 to turn on the cold water solenoid valve 24 to dispense either a metered amount of cold water or cold water for so long as the cold water switch remains pressed. If the cold water switch is not pressed as determined in step 274, then both the cold and the hot water relays are deenergized (or kept deenergized) in step 277 to turn olf the cold and hot water solenoid valves 24 and 28. Routine 221 then returns to the main loop 200 at the UV check step 202.

Figure 10:
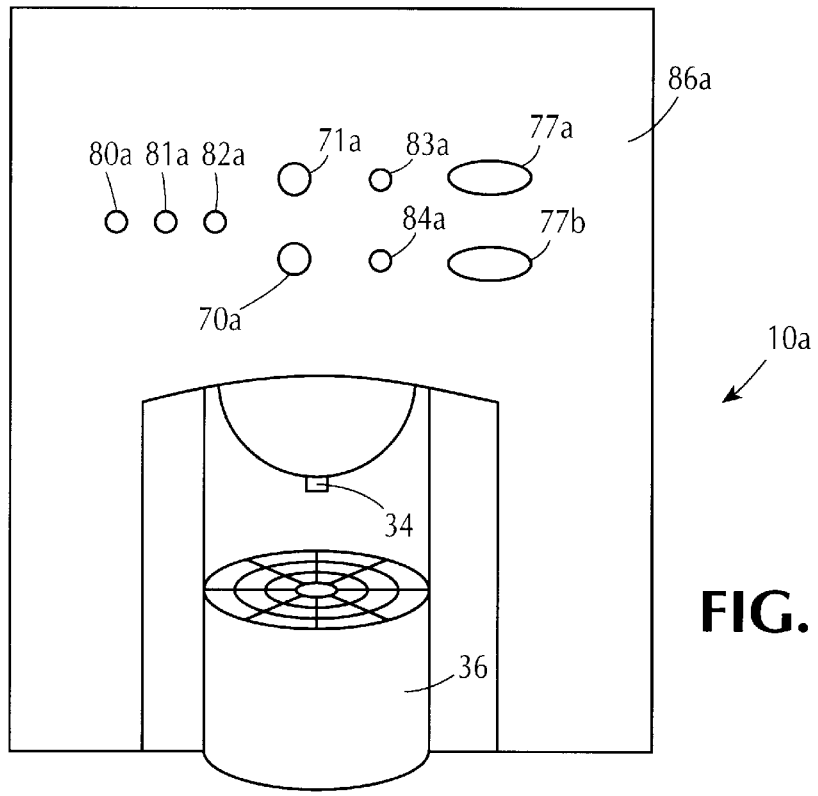
FIG. 10 is a diagrammatic view of the front control panel, water outlet and drip tray of a water dispenser according to another embodiment which incorporates the invention disclosed herein.
Figure 11:
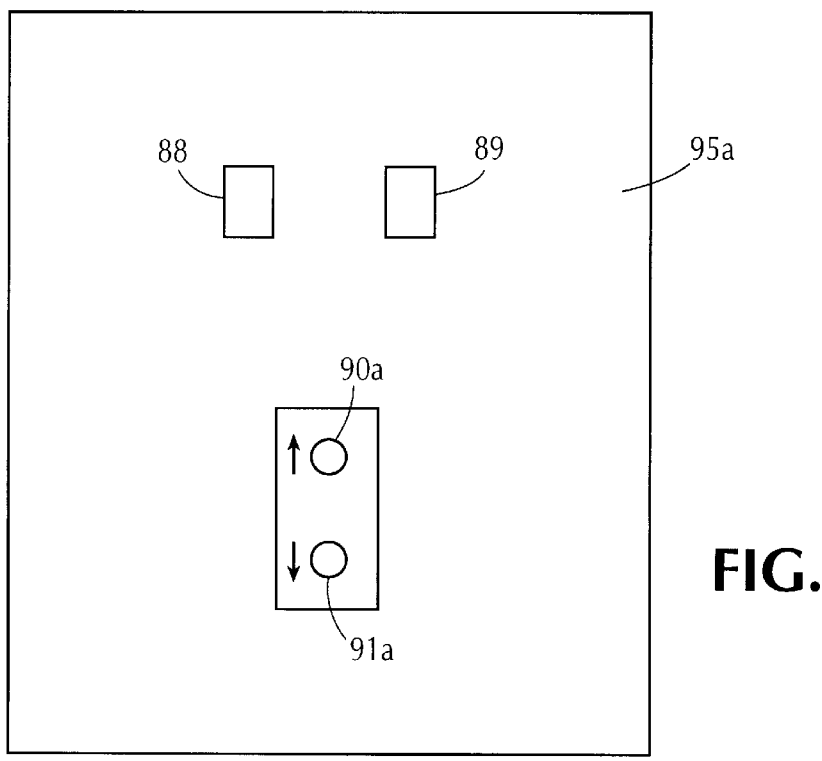
FIG. 11 is a diagrammatic view of a section of the rear control panel of the water dispenser illustrated in FIG. 10.

FIGS. 1–4 illustrate a dispenser 10 embodiment which dispenses cold and hot water. FIGS. 10 and 11 illustrate the front and rear control panels 86a and 95a, respectively, of a water dispenser 10a which dispenses only cold water. Dispenser 10a includes generally the same components as in dispenser 10 which relate to cold water filtration, temperature control, dispensing, drip tray sensing and control and temperature setting and display. In the cold water embodiment, switches 71 a and 71b activate cold water dispensing. Display 77a continuously displays the cold water set temperature and display 77b continuously displays the sensed cold water temperature. LED indicators 80a–84a display, respectively, power on, UV check fail, drip tray check fail, compressor on and cold water dispensing on.

Dispenser 10a includes the CPU 140 and associated cold water components, and operates generally as illustrated in FIGS. 5, 7 and 9 with respect to cold water control functions, with suitable modifications. For example, the main loop 200 does not include steps 207 and 220, step 218 displays only cold water temperatures, and step 221 controls only cold water functions. Also step 218 continuously displays the set and sensed temperatures. Routine 219 depicted in FIG. 7 is generally the same except that the compressor on LED 83a is turned on when the compressor is running. Routine 221 depicted in FIG. 9 does not include steps 271–273 and 275, step 277 turns only the cold solenoid valve off.

Similarly, a water dispenser may be provided which dispenses only hot water, and such a dispenser may be constructed and operate as described above for dispenser 10 with modifications to eliminate cold water functions, display and indications. Such modification will be apparent to those of skill in the art from the disclosure herein.

While the invention has been described and illustrated in connection with preferred embodiments, many variations and modifications as will be evident to those skilled in this art may be made without departing from the spirit and scope of the invention. The invention as set forth in the appended claims is thus not to be limited to the precise details of construction set forth above and such variations and modifications are intended to be included within the scope of the invention.

What is claimed is:

1. A liquid dispenser comprising:

a programmed processor;

a first sensor coupled to the programmed processor which senses the temperature of a liquid in the dispenser;

at least one of a heater and a refrigeration unit which changes the temperature of the liquid as controlled by the programmed processor;

a liquid flow control device coupled to a source of liquid to be dispensed which allows the flow of liquid therethrough and prevents the flow of the liquid therethrough as controlled by the programmed processor;

a liquid outlet in communication with the liquid flow control device;

a manually operated input device coupled to the programmed processor;

a drip tray positioned below the liquid outlet so as to receive liquid dispensed therefrom not received in a container placed between the liquid outlet and the drip tray; and a second sensor coupled to the programmed processor which senses the level of liquid in the drip tray;

the programmed processor being programmed to:

cause at least one of the heater and the refrigeration unit to change the temperature of the liquid in response to a set temperature and the temperature sensed by the first sensor; and cause the liquid flow control device to pass liquid therethrough in response to the input device and not to pass liquid therethrough in response to the second sensor.

2. A liquid dispenser comprising:

a programmed processor;

a first sensor coupled to the programmed processor which senses the temperature of a liquid in the dispenser;

at least one of a heater and a refrigeration unit which changes the temperature of the liquid as controlled by the programmed processor;

a liquid flow control device coupled to a source of liquid to be dispensed which allows the flow of liquid therethrough and prevents the flow of the liquid therethrough as controlled by the programmed processor;

a liquid outlet in communication with the liquid flow control device;

a manually operated input device coupled to the programmed processor;

an ultraviolet lamp positioned to emit ultraviolet light into the liquid to be dispensed; and a second sensor coupled to the programmed processor which senses the ultraviolet light passing through at least a portion of the liquid to be dispensed;

the programmed processor being programmed to:

cause the at least one of the heater and the refrigeration unit to change the temperature of the liquid in response to a set temperature and the temperature sensed by the first sensor; and cause the liquid flow control device to pass liquid therethrough in response to the input device and not to pass liquid therethrough in response to the second sensor.

3. A liquid dispenser comprising:
a programmed processor;
a first sensor coupled to the programmed processor which senses the temperature of a liquid in the dispenser;
at least one of a heater and a refrigeration unit which changes the temperature of the liquid as controlled by the programmed processor for changing the temperature of the liquid;
a liquid flow control device coupled to a source of liquid to be dispensed which allows the flow of liquid therethrough and prevents the flow of the liquid therethrough as controlled by the programmed processor;
a liquid outlet in communication with the liquid flow control device;
a manually operated input device coupled to the programmed processor;
a drip tray positioned below the liquid outlet so as to receive liquid dispensed therefrom not received in a container placed between the liquid outlet and the drip tray; and
a second sensor coupled to the programmed processor which senses the level of liquid in the drip tray;
an ultraviolet lamp positioned to emit ultraviolet light into the liquid to be dispensed; and
a third sensor coupled to the programmed processor which senses the ultraviolet light passing through at least a portion of the liquid to be dispensed;
the programmed processor being programmed to:
cause the at least one of the heater and the refrigeration to change the temperature of the liquid in response to a set temperature and the temperature sensed by the first sensor; and
cause the liquid flow control device to pass liquid therethrough in response to the input device and not to pass liquid therethrough in response at least one of the second and third sensors.

4. The liquid dispenser of claim 1, 2 or 3 wherein the refrigerant unit includes a compressor controlled by the programmed processor.

5. The liquid dispenser of claim 1, 2 or 3 comprising a manually operable switch coupled to the programmed processor, which is programmed to provide the set temperature in response to operation of the switch.

6. The liquid dispenser of claim 5 comprising a display coupled to the programmed processor which is programmed to display the temperature of the liquid which is to be dispensed in response to the input device.

7. The liquid dispenser of claim 1, 2 or 3 comprising a display coupled to the programmed processor which is programmed to display the temperature of the liquid which is to be dispensed in response to the input device.

8. The liquid dispenser of claim 1, 2 or 3 comprising an indicator controlled by the programmed processor which is programmed to activate the indicator when the programmed processor causes the liquid flow control device not to pass liquid therethrough in response to the second sensor.

9. The liquid dispenser of claim 8 wherein the dispenser comprises at least one of a visual device and an audio device.

10. The liquid dispenser of claim 1, 2 or 3 wherein the liquid flow control device is a solenoid valve electrically coupled to the programmed processor and positioned between the source of liquid and the outlet of the dispenser, the valve having an opened and closed condition controlled by the programmed processor.

11. The liquid dispenser of claim 10 wherein the liquid is water and the dispenser comprises at least one tank having an inlet and an outlet, and wherein the first sensor senses the temperature of water in the tank and the valve is coupled between the source of water and the inlet of the tank.

12. A liquid dispenser which dispenses a liquid or liquids at two different temperatures, comprising:
a programmed processor;
a first sensor coupled to the programmed processor which senses the temperature of a liquid in a first location in the dispenser;
a second sensor coupled to the programmed processor which senses the temperature of a liquid in a second location of the dispenser;
a heater which heats the liquid in the first location as controlled by the programmed processor;
a refrigeration unit which cools the liquid in the second location as controlled by the programmed processor;
a first liquid flow control device which allows the flow of liquid therethrough from the first location and prevents the flow of the liquid therethrough as controlled by the programmed processor;
a liquid flow control device which allows the flow of liquid therethrough from the second location and prevents the flow of the liquid therethrough as controlled by the programmed processor;
a liquid outlet in communication with the first and second liquid flow control devices;
a first manually operated input device coupled to the programmed processor;
a second manually operated input device coupled to the programmed processor;
a drip tray positioned below the liquid outlet so as to receive liquid dispensed therefrom not received in a container placed between the liquid outlet and the drip tray; and
a third sensor coupled to the programmed processor which senses the level of liquid in the drip tray;
the programmed processor being programmed to:
cause the heater and the refrigeration unit to heat and cool the liquid at the first and second locations in response to first and second set temperatures and the temperature sensed by the first and second sensors, respectively; and
cause the first and second liquid flow control devices to pass liquid therethrough from the first and second locations in response to the first and second input devices, respectively, and not to dispense liquid through the first and second liquid flow control devices in response to the third sensor.

13. A liquid dispenser which dispenses a liquid or liquids at two different temperatures, comprising:
a programmed processor;
a first sensor coupled to the programmed processor which senses the temperature of a liquid in a first location in the dispenser;
a second sensor coupled to the programmed processor which senses the temperature of a liquid in a second location of the dispenser;
a heater which heats the liquid in the first location as controlled by the programmed processor;
a refrigeration unit which cools the liquid in the second location as controlled by the programmed processor;
a first liquid flow control device which allows the flow of liquid therethrough from the first location and prevents the flow of the liquid therethrough as controlled by the programmed processor;

a second liquid flow control device which allows the flow of liquid therethrough from the second location and prevents the flow of the liquid therethrough as controlled by the programmed processor;

a liquid outlet in communication with the first and second liquid flow control devices;

a first manually operated input device coupled to the programmed processor;

a second manually operated input device coupled to the programmed processor;

an ultraviolet lamp positioned to emit ultraviolet light into the liquid to be dispensed in at least one of the first and second locations; and a third sensor coupled to the programmed processor which senses the ultraviolet light passing through at least a portion of the liquid to be dispensed;

the programmed processor being programmed to:

cause the heater and the refrigeration unit to heat and cool the liquid at the first and second locations in response to first and second set temperatures and the temperature sensed by the first and second sensors, respectively; and cause the first and second liquid flow control devices to pass liquid therethrough from the first and second locations in response to the first and second input devices, respectively, and not to dispense liquid through the first and second liquid flow control devices in response to the third sensor.

14. A liquid dispenser which dispenses a liquid or liquids at two different temperatures, comprising:

a programmed processor;

a heater which heats the liquid in the first location as controlled by the programmed processor;

a refrigeration unit which cools the liquid in the second location as controlled by the programmed processor;

a first sensor coupled to the programmed processor which senses the temperature of a liquid in a first location in the dispenser;

a second sensor coupled to the programmed processor which senses the temperature of a liquid in a second location of the dispenser;

a first liquid flow control device which allows the flow of liquid therethrough from the first location and prevents the flow of the liquid therethrough as controlled by the programmed processor;

a second liquid flow control device which allows the flow of liquid therethrough from the second location and prevents the flow of the liquid therethrough as controlled by the programmed processor;

a liquid outlet in communication with the first and second liquid flow control devices;

a first manually operated input device coupled to the programmed processor;

a second manually operated input device coupled to the programmed processor;

a drip tray positioned below the liquid outlet so as to receive liquid dispensed therefrom not received in a container placed between the liquid outlet and the drip tray; and a third sensor coupled to the programmed processor which senses the level of liquid in the drip tray;

an ultraviolet lamp positioned to emit ultraviolet light into the liquid to be dispensed in at least one of the first and second locations; and a fourth sensor coupled to the programmed processor which senses the ultraviolet light passing through at least a portion of the liquid to be dispensed;

the programmed processor being programmed to:

cause the heater and the refrigeration unit to heat and cool the liquid at the first and second locations in response to first and second set temperatures and the temperature sensed by the first and second sensors, respectively; and cause the first and second liquid flow control devices to pass liquid therethrough from the first and second locations in response to the first and second input devices, respectively, and not to dispense liquid through the first and second liquid flow control devices in response to at least one of the third and fourth sensors.

15. The liquid dispenser of claim 12, 13 or 14 wherein the refrigeration unit includes a compressor controlled by the programmed processor.

16. The liquid dispenser of claim 12, 13 or 14 comprising at least one manually operable switch coupled to the programmed processor, which is programmed to provide at least one of the set temperatures in response to operation of the switch.

17. The liquid dispenser of claim 12, 13 or 14 comprising a display coupled to the programmed processor which is programmed to display the temperatures of the liquids at the first and second locations.

18. The liquid dispenser of claim 17 comprising a display coupled to the programmed processor which is programmed to display the temperatures of the liquids at the first and second locations.

19. The liquid dispenser of claim 12 or 13 comprising an indicator controlled by the programmed processor which is programmed to activate the indicator when the programmed processor causes at least one of the first and second liquid flow control devices not to pass liquid therethrough in response to the third sensor.

20. The liquid dispenser of claim 19 wherein the indicator comprises at least one of a visual device and an audio device.

21. The liquid dispenser of claim 12, 13 or 14 wherein the first liquid flow control device comprises a solenoid valve electrically coupled to the programmed processor positioned between the source of liquid and the outlet of first location in the dispenser, the second liquid flow control device comprises a solenoid valve electrically coupled to the programmed processor positioned between the source of liquid and the second location in the dispenser, and wherein each valve has an opened and closed condition controlled by the programmed processor.

22. The liquid dispenser of claim 21 wherein the dispenser dispenses the same liquid at two different temperatures.

23. The liquid dispenser of claim 22 wherein the liquid is water and the dispenser comprises a first tank and a second tank each having an inlet and an outlet, and wherein the first sensor senses the temperature of water in the first tank, the second sensor senses the temperature of water in the second tank, the valve of the first liquid flow control device is coupled between a source of water and the inlet of the first tank, the second liquid flow control device is coupled between the source of water and the inlet of the second tank, and the outlet of the dispenser is coupled to the outlet of each of the first and second tanks.

24. The liquid sensor of claim 14 comprising an indicator controlled by the programmed processor which is programmed to activate the indicator when the programmed processor causes at least one of the first and second liquid flow control devices not to pass liquid therethrough in response to the fourth sensor.

25. A liquid dispenser comprising:

a programmed processor;

a first sensor coupled to the programmed processor which senses the temperature of a liquid in the dispenser;

at least one of a heater and a refrigeration unit which changes the temperature of the liquid as controlled by the programmed processor;

a liquid flow control device coupled to a source of liquid to be dispensed which allows the flow of liquid therethrough and prevents the flow of the liquid therethrough as controlled by the programmed processor;

a display device coupled to the programmed processor;

a liquid outlet in communication with the liquid flow control device;

a manually operated input device coupled to the programmed processor;

the programmed processor being programmed to:

cause the liquid flow control device to pass liquid therethrough in response to the input device;

cause at least one of the heater and the refrigeration unit to change the temperature of liquid in response to a set temperature and the temperature sensed by the first sensor; and cause at least one of the set temperature and the temperature of the liquid which is to be dispensed in response to the input device to be displayed on the display device.

26. The liquid dispenser of claim 25 wherein the programmed processor is programmed to provide the set temperature in response to operation of a manually operable input device.

* * * * *